United States Patent
Lang (10) Patent No.: US 12,176,527 B2
(45) Date of Patent: Dec. 24, 2024

(54) POSITIVE ELECTRODE ACTIVE MATERIAL, ELECTROCHEMICAL DEVICE, AND ELECTRONIC DEVICE

(71) Applicant: Ningde Amperex Technology Limited, Fujian (CN)

(72) Inventor: Ye Lang, Fujian (CN)

(73) Assignee: Ningde Amperex Technology Limited, Ningde (CN)

(*) Notice: Subject to any disclaimer, the term of this patent is extended or adjusted under 35 U.S.C. 154(b) by 207 days.

(21) Appl. No.: 17/201,371

(22) Filed: Mar. 15, 2021

(65) Prior Publication Data

US 2021/0336252 A1 Oct. 28, 2021

(30) Foreign Application Priority Data

Mar. 20, 2020 (CN) .......................... 202010203415.4

(51) Int. Cl.
*H01M 4/36* (2006.01)
*C01G 53/00* (2006.01)
(Continued)

(52) U.S. Cl.
CPC ............ *H01M 4/366* (2013.01); *C01G 53/50* (2013.01); *H01M 4/505* (2013.01); *H01M 4/525* (2013.01);
(Continued)

(58) Field of Classification Search
CPC ..... H01M 4/131–1315; H01M 4/1395–13915; H01M 2004/021;
(Continued)

(56) References Cited

U.S. PATENT DOCUMENTS

2007/0148545 A1 6/2007 Amine et al.
2014/0158932 A1* 6/2014 Sun ........................ H01M 4/139
252/182.1
(Continued)

FOREIGN PATENT DOCUMENTS

CN 103296249 9/2013
CN 103915618 7/2014
(Continued)

OTHER PUBLICATIONS

KR 20170063420 A Machine Translation.*
WO 2016002158 A1—English Translation (Year: 2016).*
KR-20170063420-A—English Translation (Year: 2017).*
Lang, Ye; Office Action for Chinese Application No. 202010203415.4, filed Mar. 20, 2020; mailed Jan. 26, 2021; 6 pages.
(Continued)

*Primary Examiner* — Mayla Gonzalez Ramos
*Assistant Examiner* — Bethany C Garcia
(74) *Attorney, Agent, or Firm* — Maier & Maier, PLLC (57) ABSTRACT

A positive electrode active material, including: a secondary particle formed from a primary particle. The secondary particle includes an inner part and an outer part that wraps the inner part. A ratio of an average particle size of primary particles in the outer part to an average particle size of primary particles in the inner part is G, and $1.1 \leq G \leq 10$. The outer part is a region from an interface of the secondary particle to a surface of the secondary particle, and the inner part is a region from the interface of the secondary particle to a center of the secondary particle. The positive electrode active material in this disclosure improves cycle performance while ensuring good rate performance.

16 Claims, 2 Drawing Sheets

(51) Int. Cl.
  *H01M 4/02* (2006.01)
  *H01M 4/505* (2010.01)
  *H01M 4/525* (2010.01)
  *H01M 10/0525* (2010.01)

(52) U.S. Cl.
  CPC ..... *H01M 10/0525* (2013.01); *C01P 2004/61* (2013.01); *C01P 2006/17* (2013.01); *H01M 2004/021* (2013.01); *H01M 2004/028* (2013.01); *H01M 2220/30* (2013.01)

(58) Field of Classification Search
  CPC .......... H01M 2004/028; H01M 4/366; H01M 4/485; H01M 4/505; H01M 4/525; H01M 4/1391; H01M 4/364; H01M 10/052; H01M 4/634; H01M 4/13; H01M 4/62; H01M 10/0525; H01M 10/0567; H01M 4/365; C01G 53/006–50; C01G 53/42; C01G 53/00; C01G 53/54; C01G 45/1228; C01G 45/1242; C01G 51/42; C01G 51/40; C01G 51/54; C01G 51/50; C01P 2004/61; C01P 2002/60; C01P 2006/40; C01P 2004/50; C01P 2004/62; C01P 2004/03; C01P 2004/51; C01P 2004/53; C01P 2004/54; C01P 2006/17; Y02E 60/10; Y02T 10/70; Y02P 70/50; Y10T 428/2991
  See application file for complete search history.

(56) References Cited

U.S. PATENT DOCUMENTS

| | | | | |
|---|---|---|---|---|
| 2014/0377660 | A1* | 12/2014 | Fukui | H01M 4/525 |
| | | | | 427/126.3 |
| 2016/0036041 | A1* | 2/2016 | Uwai | C01G 53/50 |
| | | | | 429/231.1 |
| 2018/0159128 | A1* | 6/2018 | Kim | H01M 10/052 |
| 2019/0393502 | A1 | 12/2019 | Yun et al. | |
| 2021/0017039 | A1* | 1/2021 | Nagao | C01G 53/50 |

FOREIGN PATENT DOCUMENTS

| | | | | |
|---|---|---|---|---|
| CN | 104466136 | | 3/2015 | |
| CN | 104953111 | | 9/2015 | |
| CN | 109273688 | | 1/2019 | |
| CN | 109428076 | | 3/2019 | |
| CN | 110416511 | | 11/2019 | |
| CN | 110429252 | | 11/2019 | |
| CN | 111370681 | | 7/2020 | |
| KR | 20170063420 A | * | 6/2017 | H01M 4/36 |
| WO | 2013183974 | | 12/2013 | |
| WO | WO-2016002158 A1 | * | 1/2016 | H01M 4/505 |

OTHER PUBLICATIONS

Lang, Ye; Extended European Search Report for Application No. 21162649.4, filed Mar. 15, 2021; mailed Aug. 26, 2021; 8 pages.

* cited by examiner

POSITIVE ELECTRODE ACTIVE MATERIAL, ELECTROCHEMICAL DEVICE, AND ELECTRONIC DEVICE

CROSS REFERENCE TO RELATED APPLICATIONS

The present application claims the benefit of priority from the Chinese Patent Application No. 202010203415.4, filed on 20 Mar. 2020, the disclosure of which is hereby incorporated by reference in its entirety.

TECHNICAL FIELD

This disclosure relates to the technical field of lithium batteries, and in particular, to a positive electrode active material, an electrochemical device, and an electronic device.

BACKGROUND

In recent years, lithium-ion batteries have been widely used in electronic devices such as a mobile phone and a notebook computer by virtue of advantages such as a high specific energy, a high operating voltage, and a low self-discharge efficiency. Rate performance and cycle performance are important performance indicators of the lithium-ion batteries. Therefore, improving the rate performance and the cycle performance is critical to improving the performance of the lithium-ion batteries.

SUMMARY

In view of the disadvantages of the prior art, an objective of this disclosure is to provide a positive electrode active material, an electrochemical device, and an electronic device. A ratio of an average particle size of primary particles in an outer part to an average particle size of primary particles in an inner part of the positive electrode active material in this disclosure is G, and 1.1≤G≤10, thereby improving cycle performance while ensuring good rate performance.

This disclosure provides a positive electrode active material, including:

a secondary particle formed from the primary particle.

The secondary particle includes an inner part and an outer part that wraps the inner part.

A ratio of an average particle size of primary particles in the outer part to an average particle size of primary particles in the inner part is G, and 1.1≤G≤10. The outer part is a region from an interface of the secondary particle to a surface of the secondary particle, and the inner part is a region from the interface of the secondary particle to a center of the secondary particle.

In the positive electrode active material, a content of an X element in the inner part is higher than a content of the X element in the outer part, and the X element includes at least one of W, Nb, V, or Mo.

In the positive electrode active material, the secondary particle satisfies at least one of conditions (a) to (c):

(a) a molar ratio of the X element contained in the outer part to the X element contained in the inner part is greater than or equal to 0 and less than or equal to 0.2;
(b) a molar percent of the X element in the inner part in relation to aggregate transition metal elements in the inner part is within a range of 0.1% to 5%; and
(c) a molar percent of the X element in the outer part in relation to aggregate transition metal elements in the outer part is within a range of 0% to 0.5%.

In the positive electrode active material, the secondary element comprises a Y element at a depth of up to 200 nm from the surface of the secondary particle, and the Y element includes at least one of Mg, Ti, or Zr.

In the positive electrode active material, the average particle size of the primary particles in the inner part is within a range of 100 nm to 2 µm; and/or the average particle size of the primary particles in the outer part is within a range of 200 nm to 5 µm.

In the positive electrode active material, a ratio of an average length-to-width ratio of the primary particles in the outer part to an average length-to-width ratio of the primary particles in the inner part is H, and 1≤H≤8.

In the positive electrode active material, an average length-to-width ratio of the primary particles in the inner part is within a range of 1 to 3; and/or an average length-to-width ratio of the primary particles in the outer part is within a range of 1.5 to 8.

In the positive electrode active material, a ratio of a porosity of the inner part to a porosity of the outer part is J, and 2≤J≤20.

In the positive electrode active material, a porosity of the inner part is within a range of 5% to 20%; and/or a porosity of the outer part is within a range of 1% to 6%.

In the positive electrode active material, a quantity of the primary particles on any diameter of the secondary particle is greater than 5.

In the positive electrode active material, the secondary particle includes a compound represented by a chemical formula $Li_cNi_{1-a-b-m-n}Co_aMe_bX_mY_nO_{2-d}Z_d$, where 0.90≤c≤1.10, 0.05≤a≤0.2, 0≤b≤0.1, 0.001≤m≤0.05, 0.001≤n≤0.01, 0≤d≤0.05, and 0.70<1−a−b−m−n<0.99.

Me is at least one of elements Mn and Al, X is at least one of elements W, Nb, V, and Mo, Y is at least one of elements Mg, Ti, and Zr, and Z is at least one of elements S, P, and Cl.

This disclosure further provides an electrochemical device, including:

a positive electrode;
a negative electrode; and
a separator, disposed between the positive electrode and the negative electrode, where
the positive electrode includes the positive electrode active material according to any of the foregoing aspects.

This disclosure further provides an electronic device. The electronic device includes the electrochemical device.

In the positive electrode active material according to embodiments of this application, the average particle size of the primary particles in the outer part is larger than the average particle size of the primary particles in the inner part, and a ratio between the two average particle sizes is G, and 1.1≤G≤10, thereby improving cycle stability of the lithium-ion battery while ensuring a high capacity and good rate performance.

BRIEF DESCRIPTION OF DRAWINGS

The foregoing and other features, advantages, and aspects of embodiments of this disclosure become more apparent with reference to the drawings and the following specific implementations. Throughout the drawings, identical or similar reference numerals represent identical or similar elements. Understandably, the drawings are merely illustrative, and components and elements are not necessarily drawn to scale.

FIG. 1 is a schematic diagram of a positive electrode active material according to an embodiment of this disclosure.

DETAILED DESCRIPTION OF EMBODIMENTS

The following describes embodiments of this disclosure in more detail with reference to the drawings. Understandably, although some embodiments of this disclosure are shown in the drawings, this disclosure may be implemented in various forms, but is not to be construed as being limited to the embodiments set forth herein. Instead, such embodiments are intended to enable a more thorough and comprehensive understanding of this disclosure. Understandably, the drawings and embodiments of this disclosure are merely intended as examples, but not intended to limit the protection scope of this disclosure.

The following describes solutions of the embodiments of this application in detail with reference to the drawings.

An embodiment of this disclosure discloses a positive electrode active material, including: a secondary particle formed from a primary particle. The secondary particle includes an inner part and an outer part that wraps the inner part. A ratio of an average particle size of primary particles in the outer part to an average particle size of primary particles in the inner part is G, and $1.1 \leq G \leq 10$. The outer part is a region from an interface of the secondary particle to a surface of the secondary particle, and the inner part is a region from the interface of the secondary particle to a center of the secondary particle.

In this embodiment of this disclosure, the interface of the secondary particle is defined as follows:
  a midpoint of a longest diameter of the secondary particle is determined;
  a line segment formed by connecting the midpoint of the longest diameter to any point on the surface of the secondary particle is a radius of the secondary particle, and a face passing through a midpoint of the radius is the interface of the secondary particle.

Figure 1:
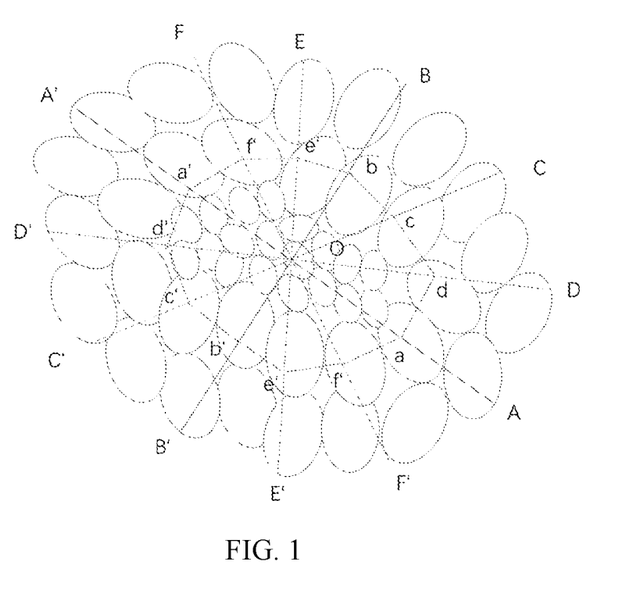

For example, referring to FIG. 1, O is the midpoint of the longest diameter AA' of the secondary particle, and a, a', b, b', c, c', d, d', e, e', f, and f' are midpoints on radiuses OA, OA', OB, OB', OC, OC', OD, OD', OE, OE', OF, and OF', respectively. A face passing through the midpoint of any of the radiuses is the interface of the secondary particle.

Specifically, in this embodiment, the positive electrode active material may be a positive electrode material of a lithium-ion battery, for example, may be a nickel-containing positive electrode material. The secondary particle may be spherical or quasi-spherical. To describe the positive electrode active material in this embodiment more clearly, FIG. 1 is schematically provided in this embodiment. Referring to FIG. 1, FIG. 1 schematically shows a topography of secondary particles. It needs to be noted that FIG. 1 is merely intended for illustration but does not limit the positive electrode active material in this disclosure in any way. The secondary particles in FIG. 1 are formed from quasi-circular primary particles. For example, a secondary particle may be formed by agglomerating a plurality of primary particles. Each primary particle has a particle size. The particle size of the primary particle means a longest diameter of the primary particle, usually obtained by performing statistics with a scanning electron microscope. The average particle size of the primary particles is an average value of the particle sizes of the primary particles. In this embodiment, the average particle size of the primary particles located in the outer part is larger than the average particle size of the primary particles located in the inner part. The ratio between the two average particle sizes is G, and $1.1 \leq G \leq 10$. FIG. 1 shows the definition of the interface. The positive electrode active material disclosed in this disclosure can be used as a positive electrode active material of a lithium-ion battery. In the lithium-ion battery, the particle size of the positive electrode active material affects the capacity, rate performance, and cycle performance of the lithium-ion battery. In the prior art, the capacity is usually increased by increasing a nickel content and reducing the particle size. However, when the nickel content is increased to a specific level, the capacity stops increasing. In addition, a too small particle size deteriorates the cycle performance and storage performance.

For the positive electrode active material disclosed in this embodiment of this disclosure, the primary particles in the inner part have a relatively small particle size and a relatively large specific surface area, thereby effectively improving the capacity and rate performance of the lithium-ion battery. However, the relatively small particle size is adverse to the cycle performance of the lithium-ion battery. In this disclosure, the primary particles of a relatively large particle size are arranged in the outer part to improve the cycle performance. It needs to be noted that, the foregoing effect is not necessarily accomplished if the average particle size in the outer part is simply larger than that in the inner part. When G is less than 1.1, the average particle size in the outer part is merely slightly larger than the average particle size in the inner part, so that the cycle performance is not improved. When the average particle size in the outer part is much larger than the average particle size in the inner part, that is, when G is greater than 10, the average particle size in the outer part is too large. Consequently, an internal resistance is increased, and an overall average particle size of the positive electrode active material is increased, thereby decreasing the overall capacity and the rate performance of the positive electrode active material. Therefore, with $1.1 \leq G \leq 10$ in this embodiment, cycle stability of the lithium-ion battery is improved while a high capacity and good rate performance are ensured.

In some embodiments of this disclosure, a content of an X element in the inner part is higher than a content of the X element in the outer part. The X element includes at least one of W, Nb, V, or Mo. In this embodiment, W, Nb, V, or Mo serving as the X element can suppress growth of crystal grains. Therefore, when the content of the X element in the outer part is lower than that in the inner part, the average particle size in the inner part is made smaller than that in the outer part. In addition, an ion conductivity of the inner part can be increased by adding the X element, so as to improve the capacity and the rate performance. In addition, the X element is mainly distributed in the inner part. Therefore, the rate performance of the inner part is enhanced without disrupting structural stability of the outer part.

In some embodiments of this disclosure, the secondary particle satisfies at least one of conditions (a) to (c): (a) a molar ratio of the X element contained in the outer part to the X element contained in the inner part is greater than or equal to 0 and less than or equal to 0.2; (b) a molar percent of the X element in the inner part in relation to aggregate transition metal elements in the inner part is within a range of 0.1% to 5%; and (c) a molar percent of the X element in the outer part in relation to aggregate transition metal elements in the outer part is within a range of 0% to 0.5%. Specifically, in this embodiment, when the condition (a) is satisfied, the X elements in the outer part are much fewer than the X elements in the inner part. The outer part may be free of the X element. The X element can suppress the growth of crystal grains. Therefore, when the condition (a) is satisfied, it is ensured that the average particle size in the outer part is larger than the average particle size in the inner part. When the condition (b) or (c) is satisfied, it indicates that a percentage of the X elements in relation to active transition metal elements is relatively low. In this way, inherent properties of the positive electrode active material will not be changed by an excessive dosage of X elements. For example, the positive electrode active material in this embodiment of this disclosure may be a nickel-containing positive material. A molar percent of the X element in relation to the transition metal elements is controlled to ensure stability of physical and chemical properties of the nickel-containing positive material. In this embodiment of this disclosure, a molar ratio of the elements in the positive electrode active material may be measured by using an inductively coupled plasma-atomic emission spectrometer (ICP-AES). A molar ratio of the elements in the inner part or the outer part may be measured by using an EDS mapping electron probe microanalyzer (EPMA), or by applying time of flight secondary ion mass spectrometry (ToF-SIMS) or X-ray photoelectron spectroscopy (XPS).

In some embodiments of this disclosure, the secondary element comprises a Y element at a depth of up to 200 nm from the surface of the secondary particle, and the Y element includes at least one of Mg, Ti, or Zr. Specifically, in this embodiment, Y elements are distributed in a region extending inward for 200 nm from an outer surface of the secondary particle. Studies have shown that the Y elements such as Mg, Ti, and Zr effectively improve the cycle performance of the positive electrode active material and resist corrosion of the electrolytic solution, but adversely affect the capacity of the material. The high capacity of the positive electrode active material in this embodiment is mainly ensured by the primary particles in the inner part. Therefore, in this embodiment, the Y elements are added merely within a near-surface scope of the secondary particle to resist the corrosion of the electrolytic solution. In this way, high cycle performance can be ensured without deteriorating the capacity of the positive electrode active material.

In some optional embodiments, the ratio of the average particle size of the primary particles in the outer part adjoining the interface to the average particle size of the primary particles in the inner part adjoining the interface is greater than 1.2.

In some embodiments of this disclosure, the average particle size of the primary particles in the inner part is within a range of 100 nm to 2 μm; and/or, the average particle size of the primary particles in the outer part is within a range of 200 nm to 5 μm. A reduced particle size can increase the capacity of the positive electrode active material. Therefore, the average particle size of the primary particles in the inner part is controlled to fall within a specific range to ensure a high capacity of the positive electrode active material. In addition, if the average particle size of the particles in the outer part is too large, the overall particle size of the positive electrode active material will increase, thereby resulting in adverse effects such as decrease of the overall capacity of the positive electrode active material and increase of the internal resistance. Therefore, the average particle size in the outer part needs to be controlled.

In some embodiments of this disclosure, a ratio of an average length-to-width ratio of the primary particles in the outer part to an average length-to-width ratio of the primary particles in the inner part is H, and 1≤H≤8. Specifically, in this embodiment, the length-to-width ratio is D1/D2, where D1 is a longest diameter of the primary particles, and D2 is a longest diameter among all diameters perpendicular to the longest diameter of the primary particles. The length-to-width ratio may be obtained based on measurement and statistics performed by using a high-magnification SEM-CP image. The length-to-width ratio reflects similarity between the primary particle and a sphere. The length-to-width ratio of a sphere is 1. Therefore, a primary particle in the outer part is more different from a sphere than a primary particle in the inner part. A specific surface area of a sphere is the smallest. The outer part is made non-circular, so that the primary particles in the outer part can provide a larger reaction surface. This can improve the rate performance of the outer part and make up for the adverse effect caused by the large particle size to the rate performance.

In some embodiments of this disclosure, an average length-to-width ratio of the primary particles in the inner part is within a range of 1 to 3; and/or an average length-to-width ratio of the primary particles in the outer part is within a range of 1.5 to 8. In this embodiment, the length-to-width ratio of the primary particles in the inner part is controlled to ensure that the primary particles in the inner part are quasi-circular, reduce a contact area between the inner part and the electrolytic solution, and suppress the electrolytic solution from corroding the inner part, thereby preventing deterioration of the cycle performance in the inner part. By controlling the length-to-width ratio of the outer part, the primary particles in the outer part can provide a larger reaction surface, and improve the rate performance of the outer part.

In some embodiments of this disclosure, a ratio of a porosity of the inner part to a porosity of the outer part is J, and 2≤J≤20. The porosity means a ratio of a pore area to a total area. The porosity may be obtained based on a high-magnification SEM image of the positive electrode active material, where the SEM image is processed by using image processing software such as Photoshop (PS). The processing steps are as follows:

a) loading an SEM image into the PS;
b) selecting a to-be-measured part by using a Magnetic Lasso tool;
c) selecting a color range in [Select]; in Selection Preview, selecting "Grayscale" and selecting "Dark Tone";
d) selecting a histogram in the window, and noting down a pixel of pores in an expanded view;
e) selecting the to-be-measured part again by using the Magnetic Lasso tool, and noting down a pixel; and
f) performing a division operation to obtain the porosity.

In some embodiments of this disclosure, the porosity of the inner part is significantly higher than that of the outer part, indicating that the inner part is porous. That is because the primary particles in the inner part are not fully grown but the primary particles in the outer part are fully grown. Optionally, the porosity of the inner part is within a range of 5% to 20%; and/or the porosity of the outer part is within a range of 1% to 6%.

In some embodiments of this disclosure, the quantity of the primary particles on any diameter of the secondary particle is greater than 5. Optionally, the quantity of the primary particles on any diameter of the secondary particle is 10 to 20.

In some embodiments of this disclosure, the secondary particle includes a compound represented by a chemical formula $Li_cNi_{1-a-b-m-n}CO_aMe_bX_mY_nO_{2-d}Z_d$, where $0.90 \leq c \leq 1.10$, $0.05 \leq a \leq 0.2$, $0 \leq b \leq 0.1$, $0.001 \leq m \leq 0.05$, $0.001 \leq n \leq 0.02$, $0 \leq d \leq 0.05$, and $0.70 < 1-a-b-m-n < 0.99$, where Me is at least one of elements Mn and Al, X is at least one of elements W, Nb, V, and Mo, Y is at least one of elements Mg, Ti, and Zr, and Z is at least one of elements S, P, and Cl. In some optional embodiments, $2 \leq m/n \leq 50$.

In some embodiments of this disclosure, $0.01 \text{ Å} \leq K \leq 0.15$ Å, where K is a difference between (i) an average lithium layer spacing corresponding to a crystal plane of the primary particle (003) in the inner part, and (ii) an average lithium layer spacing corresponding to a crystal plane of the primary particle (003) in the outer part. That is because the content of the X element in the inner part is higher than that in the outer part, and thereby leads to expansion of a crystal lattice. The larger the average lithium layer spacing corresponding to the crystal plane of the primary particle (003), the higher the rate performance. In some embodiments, the average lithium layer spacing corresponding to the crystal plane of the primary particle (003) may be measured by using a transmission electron microscope. In some embodiments, the average lithium layer spacing corresponding to the crystal plane of the primary particle (003) in the inner part is within a range of 2.60 Å to 2.70 Å. In some embodiments, the average lithium layer spacing corresponding to the crystal plane of the primary particle (003) in the outer part is within a range of 2.55 Å to 2.65 Å. In some embodiments, unit cell parameters of the positive electrode active material fall within the following ranges: $2.870 \text{ Å} \leq a \leq 2.880 \text{ Å}$, and $14.180 \text{ Å} \leq c \leq 14.200 \text{ Å}$.

In some embodiments of this disclosure, the X elements such as W, Nb, and Mo may be added into the inner part to suppress growth of the crystal grains, so as to cause the average particle size of the primary particles in the inner part to be relatively small, and to cause the average particle size of the primary particles in the outer part to be relatively large. By means of controlling the particle size of the primary particles in the inner part and the outer part, the capacity and the rate performance of the positive electrode active material can be enhanced. By means of reducing the size of the primary particles in the inner part, the capacity and the rate performance can be effectively improved. By means of increasing the size of the primary particles in the outer part, the cycle performance can be prevented from deteriorating. The X elements mainly exist in the inner part. Therefore, the rate performance of the inner part can be enhanced without disrupting structural stability of the outer surface of the positive electrode active material.

In addition, to ensure high cycle performance, the Y elements such as Mg, Ti, Zr are added into the positive electrode active material. This can effectively improve the cycle performance of the positive electrode active material. However, the Y elements deteriorate the capacity and the rate performance to some extent. Therefore, in some embodiments, the Y elements are added merely within a near-surface scope of the secondary particle to resist the corrosion of the electrolytic solution while minimizing the deterioration of the capacity and the rate performance.

To describe the positive electrode active material according to the embodiments of this disclosure more clearly, the following describes the positive electrode active material with reference to Embodiments 1~26 and Comparative Embodiments 1~2. One or more of a particle size test, an electrical performance test, and an X-ray diffraction analysis (XRD) test will be performed on the positive electrode active materials in Embodiments 1~26 and Comparative Embodiments 1~2. Test methods of the tests are described below first.

(1) Measuring a Particle Size

A particle size of a sample in Embodiments 1~26 and Comparative Embodiments 1~2 means a Dv50 value measured by a laser particle size analyzer. The particle size test is to analyze the particle size of the sample by using a Mastersizer 2000 laser particle size distribution analyzer, where a sample feeding system is Hydro 2000SM wet dispersion, a measurement range is 0.01 μm~3,500 μm, and a light source is Red light: Helium neon laser/blue light: Solid state light source, and a detection angle is 0~144°. A sample test time is 6 s, a background test time is 6 s, the number of snaps in the sample test is 6,000, the test is performed for 3 cycles and an average value of test results is obtained, a rotation speed of a mixing pump is 3,000 rpm, and an analysis mode is set to 'General purpose'.

(2) Measuring Electrical Performance

A method for measuring electrical performance includes: leaving a prepared lithium-ion battery to stand at a test temperature of approximately 25° C. for approximately 2 hours, charging the lithium-ion battery at a constant current of approximately 1.5 C until the voltage reaches approximately 4.25 V, charging the battery at a constant voltage of approximately 4.25 V until the current reaches approximately 0.02 C, leaving the battery to stand for approximately 15 minutes, discharging the lithium-ion battery at a constant current of 0.1 C until the voltage reaches approximately 2.8V, and leaving the battery to stand for approximately 30 minutes; and performing the foregoing process for 3 cycles, charging the lithium-ion battery at a constant current of 1.5 C until the voltage reaches approximately 4.25 V, charging the battery at a constant voltage of approximately 4.25 V until the current reaches approximately 0.02 C, leaving the battery to stand for approximately 15 minutes, discharging the lithium-ion battery at a constant current of 5 C until the voltage reaches approximately 2.8V, and leaving the battery to stand for approximately 30 minutes; and, after completion of the foregoing charging and discharging processes, measuring a discharge capacity of the lithium-ion battery at different C-rates.

In the following embodiments, a 0.1 C discharge capacity means a capacity measured after the battery is discharged at a current of 0.1 C in a first cycle, and 5 C/0.1 C capacity retention rate=first-cycle discharge capacity at 5 C/first-cycle discharge capacity at 0.1 C×100%.

The method for measuring electrical performance further includes: leaving a lithium-ion battery to stand at a test temperature of approximately 25° C. for approximately 2 hours, charging the lithium-ion battery at a constant current of approximately 1 C until the voltage reaches approximately 4.2 V, charging the battery at a constant voltage of approximately 4.2 V until the current reaches approximately 0.02 C, leaving the battery to stand for approximately 15 minutes, discharging the lithium-ion battery at a constant current of 4 C until the voltage reaches approximately 2.8V, and leaving the battery to stand for approximately 30 minutes; and recording a capacity at this time as a first-cycle discharge capacity; repeating the foregoing process for 500 cycles, and recording a discharge capacity at this time as a $500^{th}$-cycle discharge capacity; and calculating a $500^{th}$-cycle capacity retention rate of the lithium-ion battery according to the following formula:

$500^{th}$-cycle capacity retention rate=($500^{th}$-cycle discharge capacity/first-cycle discharge capacity)×100%.

(3) Measuring Unit Cell Parameters

In the following embodiments, the unit cell parameters are obtained by X-ray diffraction analysis (X-ray diffraction, XRD), using a Philips X'Pert Pro X-ray analyzer, a Cu target Kα radiation source (λ=0.15418 nm), a Ni filter, a scanning speed of 1° min-1, and a scanning range of 10°~120°. The unit cell parameters of the positive electrode active material are calculated by using GSAS/EXPGUI software.

The following describes Embodiments 1 to 8 and Comparative Embodiments 1 to 2.

Preparing a positive electrode active material in Embodiments 1~8: The preparation method includes: first, mixing $NiSO_4 \cdot 6H_2O$, $CoSO_4 \cdot 7H_2O$, and $WO_3$ at a molar ratio of Ni:Co:W=0.90:0.097:0.003 to make a suspension, using NaOH instead to make an alkaline solution, and using $NH_3 \cdot H_2O$ instead to make an ammonia solution; adding the three solutions (saline solution, alkaline solution, and ammonia solution) into a reaction vessel concurrently; controlling a stirring speed to be 1,300 rpm during the reaction, and controlling the temperature to be 52±2° C. in a live manner by using a jacketed oil bath; adjusting a pH value to 11.2 by controlling a dosage of ammonia; after the reaction lasts for a first period T1, adding a mixed saline solution of $NiSO_4 \cdot 6H_2O$ and $CoSO_4 \cdot 7H_2O$ at a molar ratio of Ni:Co=0.9:0.1; at this stage, controlling the stirring speed to be 800 rpm, and adjusting the pH value to 11.7; and obtaining a slurry after the reaction lasts for a second period T2, and filtering, washing, and drying the slurry to obtain a precursor of a positive electrode material; and mixing the precursor and LiOH at a ratio of Li/(Ni+Co+W)=1.05, sintering the mixture at 780° C. for 18 hours to obtain a first sintered product, mixing the first sintered product and $ZrO_2$ at a ratio of Zr/(Ni+Co+W)=0.002, and thermally treating the mixture at 650° C. for 12 hours to obtain a positive electrode active material.

Different T1 and T2 values are used in Embodiments 1 to 8, as shown in Table 1.

TABLE 1

|  | Embodiment 1 | Embodiment 2 | Embodiment 3 | Embodiment 4 | Embodiment 5 | Embodiment 6 | Embodiment 7 | Embodiment 8 |
|---|---|---|---|---|---|---|---|---|
| T1 (min) | 10 | 30 | 30 | 30 | 30 | 30 | 60 | 120 |
| T2 (h) | 20 | 15 | 20 | 24 | 27 | 30 | 27 | 30 |

Preparing a positive electrode active material in Comparative Embodiment 1: The preparation method includes: mixing $NiSO_4 \cdot 6H_2O$, $CoSO_4 \cdot 7H_2O$, and $MnSO_4$ at a molar ratio of Ni:Co:Mn=0.8:0.1:0.1 to make a suspension, using NaOH instead to make an alkaline solution, and using $NH_3 \cdot H_2O$ instead to make an ammonia solution; adding the three solutions (saline solution, alkaline solution, and ammonia solution) into a reaction vessel concurrently; controlling a stirring speed to be 800 rpm during the reaction, and controlling the temperature to be 52±2° C. in a live manner by using a jacketed oil bath; adjusting the pH value to 11.5 by controlling the dosage of ammonia, obtaining a slurry after the reaction lasts for 24 hours, and filtering, washing, and drying the slurry to obtain a precursor of a positive electrode material; and mixing the precursor and LiOH, sintering the mixture at 780° C. for 18 hours to obtain a first sintered product, mixing the first sintered product and $Al_2O_3$ at a stoichiometric ratio, and thermally treating the mixture at 600° C. for 6 hours to obtain a positive electrode active material.

Preparing a positive electrode active material in Comparative Embodiment 2: The preparation method includes: mixing $NiSO_4 \cdot 6H_2O$, $CoSO_4 \cdot 7H_2O$, and $MnSO_4$ at a molar ratio of Ni:Co:Mn=0.8:0.1:0.1 to make a suspension, using NaOH instead to make an alkaline solution, and using $NH_3 \cdot H_2O$ instead to make an ammonia solution; adding the three solutions, that is, saline solution, alkaline solution, and ammonia solution, into a reaction vessel concurrently; controlling a stirring speed to be 800 rpm during the reaction, and controlling the temperature to be 52±2° C. in a live manner by using a jacketed oil bath; adjusting the pH value to 11.5 by controlling the dosage of ammonia, obtaining a slurry after the reaction lasts for 24 hours, and filtering, washing, and drying the slurry to obtain a precursor of a positive electrode material; and mixing the precursor, LiOH, and $WO_3$, sintering the mixture at 780° C. for 18 hours to obtain a first sintered product, mixing the first sintered product and $Al_2O_3$ at a stoichiometric ratio, and thermally treating the mixture at 600° C. for 6 hours to obtain a positive electrode active material.

Test results of Embodiments 1 to 8 and Comparative Embodiments 1 to 2 are shown in Table 2.

TABLE 2

| Serial number | Average particle size of primary particles in the inner part (μm) | Average particle size of primary particles in the outer part (μm) | G | First-cycle discharge capacity (mAh/g) | 5 C/0.2 C capacity retention rate | 500$^{th}$-cycle capacity retention rate |
|---|---|---|---|---|---|---|
| Embodiment 1 | 0.13 | 0.86 | 6.62 | 217.2 | 86% | 80% |
| Embodiment 2 | 0.40 | 0.45 | 1.13 | 217.1 | 84% | 80% |
| Embodiment 3 | 0.42 | 1.23 | 2.93 | 216.6 | 84% | 84% |
| Embodiment 4 | 0.46 | 2.20 | 4.78 | 216.1 | 82% | 87% |
| Embodiment 5 | 0.44 | 3.12 | 7.09 | 215.4 | 82% | 89% |
| Embodiment 6 | 0.46 | 4.77 | 10.37 | 215.2 | 79% | 90% |
| Embodiment 7 | 1.05 | 2.99 | 2.85 | 213.2 | 77% | 91% |
| Embodiment 8 | 2.06 | 5.02 | 2.44 | 213.0 | 75% | 92% |
| Comparative Embodiment 1 | 0.44 | 0.42 | 0.95 | 208.2 | 71% | 77% |
| Comparative Embodiment 2 | 0.16 | 0.15 | 0.94 | 218.3 | 88% | 65% |

As can be seen in Table 2, the average particle size of the primary particles in the inner part and the outer part as well as the ratio G are changed by adjustment of the first period T1 and the second period T2. As shown in Table 2, the test results of Embodiments 1 and 3 show that, when the second period T2 is identical, the longer the first period T1, the larger the average particle size of the primary particles in the inner part. The test results of Embodiments 2 to 6 show that, with the increase of the second period T2, the average particle size of the primary particles in the inner part increases slightly, but the average particle size of the primary particles in the outer part increases significantly. That is, the second period affects the average particle size of the primary particles in the inner part and the outer part, and affects the average particle size of the primary particles in the outer part more significantly.

The 500$^{th}$-cycle capacity retention rate in Embodiments 1 to 8 is significantly higher than that in Comparative Embodiments 1 and 2. G is greater than 1 in Embodiments 1 to 8, but is less than 1 in Comparative Embodiments 1 and 2. Evidently, the cycle performance can be improved significantly by means of controlling the average particle size of the primary particles in the outer part to be larger than the average particle size of the primary particles in the inner part.

When G is greater than 1, in terms of the 500$^{th}$-cycle capacity retention rate in Embodiments 1 to 8, the 500$^{th}$-cycle capacity retention rate in Embodiments 6 to 8 is significantly higher than that in Embodiments 1 to 5. That is because the average particle size of the primary particles in the outer part in Embodiments 6 to 8 is larger. The larger average particle size of the primary particles helps to improve the cycle performance. However, the 500$^{th}$-cycle capacity retention rate and the first-cycle discharge capacity in Embodiment 6 starts deteriorating significantly due to the too large value of G. Therefore, in the embodiments of this disclosure, G is controlled to be 1.1≤G≤10.

In terms of the first-cycle discharge capacity and the 5 C/0.2 C capacity retention rate measured after storage at −10° C. in Embodiments 1 to 8, the first-cycle discharge capacity and the 5 C/0.2 C capacity retention rate measured after storage at −10° C. in Embodiment 8 are lower than those in Embodiments 1 to 7. That is because the average particle size of the primary particles in the inner part and the average particle size of the primary particles in the outer part in Embodiment 8 are larger. The larger primary particles lead to capacity attenuation and deteriorate the rate performance. Therefore, in the embodiments of this disclosure, the average particle size of the primary particles in the inner part is preferably within a range of 100 nm to 2 μm, and the average particle size of the primary particles in the outer part is preferably within a range of 200 nm to 5 μm.

The following describes Embodiments 9 to 19.

Preparing a positive electrode active material in Embodiment 9: The preparation method includes: first, mixing NiSO$_4$·6H$_2$O, CoSO$_4$·7H$_2$O, and WO$_3$ at a molar ratio of Ni:Co:W=0.80:0.197:0.003 to make a suspension, using NaOH instead to make an alkaline solution, and using NH$_3$·H$_2$O instead to make an ammonia solution; adding the three solutions, that is, saline solution, alkaline solution, and ammonia solution, into a reaction vessel concurrently; controlling a stirring speed to be 1,300 rpm during the reaction, and controlling the temperature to be 52±2° C. in a live manner by using a jacketed oil bath; adjusting a pH value to 11.2 by controlling a dosage of ammonia; after the reaction lasts for 10 minutes, adding a mixed saline solution of NiSO$_4$·6H$_2$O and CoSO$_4$·7H$_2$O at a stoichiometric ratio of Ni:Co=0.8:0.2; at this stage, controlling the stirring speed to be 800 rpm, and adjusting the pH value to 11.7; and obtaining a slurry after the reaction lasts for 20 hours, and filtering, washing, and drying the slurry to obtain a precursor of a positive electrode material; and mixing the precursor and LiOH at a ratio of Li/(Ni+Co+W)=1.05, sintering the mixture at 780° C. for 18 hours to obtain a first sintered product, mixing the first sintered product and ZrO$_2$ at a ratio of Zr/(Ni+Co+W)=0.002, and thermally treating the mixture at 650° C. for 12 hours to obtain a positive electrode active material.

The method for preparing the positive electrode active material in Embodiment 10 differs from the method for preparing the positive electrode active material in Embodiment 9 merely in that the ingredient WO$_3$ is replaced with Nb$_2$O$_5$.

The method for preparing the positive electrode active material in Embodiment 11 differs from the method for preparing the positive electrode active material in Embodiment 9 merely in that the ingredient WO₃ is replaced with MoO₃.

The method for preparing the positive electrode active material in Embodiment 12 differs from the method for preparing the positive electrode active material in Embodiment 9 merely in that the ingredient WO₃ is replaced with V₂O₅.

The method for preparing the positive electrode active material in Embodiment 13 differs from the method for preparing the positive electrode active material in Embodiment 9 merely in that the ingredient WO₃ is replaced with WO₃ and Nb₂O₅.

The method for preparing the positive electrode active material in Embodiment 14 differs from the method for preparing the positive electrode active material in Embodiment 9 merely in that the ingredient WO₃ is replaced with Nb₂O₅ and MoO₃.

The method for preparing the positive electrode active material in Embodiment 15 differs from the method for preparing the positive electrode active material in Embodiment 9 merely in that the ingredient WO₃ is replaced with WO₃, MoO₃, V₂O₅.

The method for preparing the positive electrode active material in Embodiment 16 differs from the method for preparing the positive electrode active material in Embodiment 9 merely in that the Ni:Co:W=0.80:0.197:0.003 is replaced with Ni:Co:W=0.80:0.199:0.001.

The method for preparing the positive electrode active material in Embodiment 17 differs from the method for preparing the positive electrode active material in Embodiment 9 merely in that the Ni:Co:W=0.80:0.197:0.003 is replaced with Ni:Co:W=0.80:0.195:0.005.

The method for preparing the positive electrode active material in Embodiment 18 differs from the method for preparing the positive electrode active material in Embodiment 9 merely in that the Ni:Co:W=0.80:0.197:0.003 is replaced with Ni:Co:W=0.80:0.192:0.008.

The method for preparing the positive electrode active material in Embodiment 19 differs from the method for preparing the positive electrode active material in Embodiment 9 merely in that the Ni:Co:W=0.80:0.197:0.003 is replaced with Ni:Co:W=0.80:0.19:0.01.

The method for preparing the positive electrode active material in Embodiment 20 differs from the method for preparing the positive electrode active material in Embodiment 9 merely in that the Ni:Co:W=0.80:0.197:0.003 is replaced with Ni:Co:W=0.80:0.18:0.02.

The method for preparing the positive electrode active material in Embodiment 21 differs from the method for preparing the positive electrode active material in Embodiment 9 merely in that the Ni:Co:W=0.80:0.197:0.003 is replaced with Ni:Co:W=0.80:0.15:0.05.

Different X elements or different amounts of X elements are added in Embodiments 9 to 21. Test results of Embodiments 9 to 21 are shown in Table 3.

TABLE 3

| Serial number | Type of X element | Content of X element in inner part | Content of X element in outer part | Ratio of content of X element of outer part to inner part | Lattice spacing of (003) in inner part | Lattice spacing of (003) in outer part | Spacing difference |
|---|---|---|---|---|---|---|---|
| Embodiment 9 | W | 0.28% | 0.02% | 0.07 | 2.66 | 2.62 | 0.04 |
| Embodiment 10 | Nb | 0.29% | 0.01% | 0.03 | 2.66 | 2.62 | 0.04 |
| Embodiment 11 | Mo | 0.28% | 0.02% | 0.07 | 2.66 | 2.62 | 0.04 |
| Embodiment 12 | V | 0.24% | 0.06% | 0.25 | 2.66 | 2.62 | 0.04 |
| Embodiment 13 | W + Nb | 0.29% | 0.01% | 0.03 | 2.66 | 2.62 | 0.04 |
| Embodiment 14 | Nb + Mo | 0.29% | 0.01% | 0.03 | 2.66 | 2.62 | 0.04 |
| Embodiment 15 | W + Mo + V | 0.29% | 0.01% | 0.03 | 2.66 | 2.62 | 0.04 |
| Embodiment 16 | W | 0.10% | <0.01% | / | 2.61 | 2.6 | 0.01 |
| Embodiment 17 | W | 0.45% | 0.04% | 0.09 | 2.67 | 2.63 | 0.04 |
| Embodiment 18 | W | 0.70% | 0.10% | 0.14 | 2.69 | 2.62 | 0.07 |
| Embodiment 19 | W | 0.94% | 0.07% | 0.07 | 2.69 | 2.64 | 0.05 |
| Embodiment 20 | W | 1.73% | 0.32% | 0.18 | 2.74 | 2.62 | 0.12 |
| Embodiment 21 | W | 4.53% | 0.53% | 0.12 | 2.75 | 2.69 | 0.06 |

As shown in Table 3, the test results of Embodiments 9 to 15 show that the lattice spacing of (003) in the inner part depends on the type of the X element. Atomic radiuses of W, Nb, Mo, and V are close to each other. Therefore, after the inner part is doped with an identical amount of X elements, the lattice spacing is nearly identical between the primary particles (003) in the inner part. Therefore, in Embodiments 9 to 15, the lattice spacing differs scarcely between the primary particles (003) in the inner part. The test results of Embodiments 16 to 18 show that, as the content of W added in the inner part increases, the lattice spacing of (003) in the inner part gradually increases. That is because the added W elements cause the lattice to expand. The larger the amount of the added W elements, the larger the expansion of the lattice.

Electrochemical performance test results of Embodiments 9 to 21 are shown in Table 4. The test results show that, the first-cycle discharge capacity and the 5 C/0.2 C rate performance of the material are improved significantly with the increase of the lattice spacing. However, with the increase of the X elements, the particle size of the primary particles is actually reduced, resulting in a slight decrease in the cycle capacity retention rate. In addition, as the content of the X elements increases, the particle size of the primary particles tends to be smaller, but does not change obviously after the content of the X elements exceeds 0.5%. The discharge capacity and the rate performance actually increase with the decrease of the particle size of the particles.

TABLE 4

| Serial number | Average particle size of primary particles in the inner part (μm) | Average particle size of primary particles in the outer part (μm) | G | First-cycle discharge capacity (mAh/g) | 5 C/0.2 C capacity retention rate | 500$^{th}$-cycle capacity retention rate |
| --- | --- | --- | --- | --- | --- | --- |
| Embodiment 1 | 0.13 | 0.86 | 6.62 | 217.2 | 86% | 80% |
| Embodiment 9 | 0.14 | 0.87 | 6.21 | 210.5 | 90% | 83% |
| Embodiment 10 | 0.14 | 0.87 | 6.21 | 210.3 | 89% | 84% |
| Embodiment 11 | 0.13 | 0.87 | 6.69 | 211 | 90% | 84% |
| Embodiment 12 | 0.14 | 0.87 | 6.21 | 211.2 | 90% | 82% |
| Embodiment 13 | 0.14 | 0.87 | 6.21 | 211.4 | 89% | 83% |
| Embodiment 14 | 0.13 | 0.87 | 6.21 | 210.9 | 90% | 82% |
| Embodiment 15 | 0.13 | 0.87 | 6.21 | 211.3 | 89% | 83% |
| Embodiment 16 | 0.22 | 0.87 | 3.95 | 207.5 | 87% | 82% |
| Embodiment 17 | 0.1 | 0.73 | 7.3 | 211.7 | 92% | 80% |
| Embodiment 18 | 0.09 | 0.74 | 8.22 | 212.8 | 94% | 80% |
| Embodiment 19 | 0.11 | 0.76 | 6.91 | 213.1 | 95% | 80% |
| Embodiment 20 | 0.1 | 0.71 | 7.1 | 214.5 | 96% | 79% |
| Embodiment 21 | 0.1 | 0.7 | 7 | 214.9 | 96% | 78% |

The following describes Embodiments 22 to 28.

Preparing a positive electrode active material in Embodiments 20 to 26: The preparation method includes: mixing $NiSO_4 \cdot 6H_2O$, $CoSO_4 \cdot 7H_2O$, and $WO_3$ at a molar ratio of Ni:Co:W=0.90:0.097:0.003 to make a suspension, using NaOH instead to make an alkaline solution, and using $NH_3 \cdot H_2O$ instead to make an ammonia solution; adding the three solutions, that is, saline solution, alkaline solution, and ammonia solution, into a reaction vessel concurrently; controlling a stirring speed to be r1 rpm during the reaction, and controlling the temperature to be 52±2° C. in a live manner by using a jacketed oil bath; adjusting a pH value to pH1 by controlling a dosage of ammonia; after the reaction lasts for 10 minutes, adding a mixed saline solution of $NiSO_4 \cdot 6H_2O$ and $CoSO_4 \cdot 7H_2O$ at a stoichiometric ratio of Ni:Co=0.9:0.1; at this stage, controlling the stirring speed to be r2 rpm, and adjusting the pH value to pH2; and obtaining a slurry after the reaction lasts for a period of T2, and filtering, washing, and drying the slurry to obtain a precursor of a positive electrode material; and mixing the precursor and LiOH, sintering the mixture at 780° C. for 18 hours to obtain a first sintered product, mixing the first sintered product and $ZrO_2$ at a ratio of Zr/(Ni+Co+W)=0.002, and thermally treating the mixture at 650° C. for 12 hours to obtain a finished product.

Embodiments 22 to 28 differ in values of pH1, pH2, r1, r2, and T2. The values of pH1, pH2, r1, r2, and T2 used in Embodiments 22 to 28 are shown in Table 5.

TABLE 5

| Serial number | pH 1 | r1 | pH 2 | r2 | T2 |
| --- | --- | --- | --- | --- | --- |
| Embodiment 22 | 11.0 | 1500 | 11.7 | 1000 | 22 |
| Embodiment 23 | 11.0 | 1500 | 11.9 | 800 | 22 |
| Embodiment 24 | 11.0 | 1500 | 12.3 | 800 | 22 |
| Embodiment 25 | 11.0 | 1500 | 12.5 | 800 | 22 |
| Embodiment 26 | 11.2 | 1200 | 11.5 | 900 | 27 |
| Embodiment 27 | 11.4 | 1200 | 11.5 | 900 | 27 |
| Embodiment 28 | 11.5 | 1200 | 11.5 | 900 | 27 |

Test results of Embodiments 22 to 28 are shown in Table 6.

TABLE 6

| Serial number | Length-to-width ratio of primary particles in inner part | Length-to-width ratio of primary particles in outer part | H | Porosity of inner part | Porosity of outer part | J |
| --- | --- | --- | --- | --- | --- | --- |
| Embodiment 22 | 1.2 | 1.5 | 1.3 | 6.1% | 1.4% | 4.36 |
| Embodiment 23 | 1.1 | 3.0 | 2.7 | 6.6% | 2.3% | 2.87 |
| Embodiment 24 | 1.1 | 5.4 | 4.9 | 6.5% | 4.4% | 1.48 |
| Embodiment 25 | 1.1 | 8.2 | 7.5 | 6.6% | 5.8% | 1.14 |
| Embodiment 26 | 1.6 | 2.4 | 1.5 | 9.3% | 1.2% | 7.75 |
| Embodiment 27 | 2.2 | 2.6 | 1.2 | 14.5% | 1.1% | 13.18 |
| Embodiment 28 | 2.9 | 3.1 | 1.1 | 19.4% | 1.2% | 16.17 |

As shown in Table 5 and Table 6, Embodiments 22 to 25 show that, with the increase of the pH2 value, the length-to-width ratio of the primary particles in the outer part increases significantly, and the porosity of the outer part increases. Embodiments 26 to 28 show that, with the increase of the pH1 value, the length-to-width ratio of the primary particles in the inner part and the length-to-width ratio of the primary particles in the outer part increase, and the porosity of the inner part increases.

Electrical performance test results of Embodiments 22 to 28 are shown in Table 7. Embodiments 22 to 25 show that, with the increase of the porosity and the length-to-length ratio of the primary particles in the outer part, the rate performance and the discharge capacity of the particles increase significantly, but the cycle capacity retention rate actually decreases. A reason is that, with the increase of the porosity in the outer part, transmission channels of lithium ions increase, and the rate performance and the capacity increase. However, on the other hand, side reactions with an electrolytic solution also increase, and the cycle capacity retention rate decreases to some extent. Embodiments 26~28 show that, with the increase of the porosity and the length-to-width ratio of the primary particles in the inner part, the first-cycle discharge capacity and the 5 C/0.2 C capacity retention rate increase to some extent, but the cycle capacity retention rate basically does not deteriorate. That is because the electrolytic solution forms an SEI (solid electrolyte interface, solid electrolyte interface) film on surface particles, thereby deferring corrosion to internal particles.

oxide (a Zr oxide is $ZrO_2$, a Mg oxide is MgO, and a Ti oxide is $ZrO_2$) at a stoichiometric ratio of Y/(Ni+Co+W)=n, and then thermally treating the mixture at 650° C. for 12 hours to obtain a positive electrode active material.

Table 8 shows the type and content of different Y elements and the corresponding electrochemical performance. Embodiments 29 to 32 show that, with the increase of the content of the Zr element, the capacity and the rate performance are decreased significantly, but the cycle capacity retention rate is increased significantly. Embodiments 33 to 35 describe circumstances in which several types of Y elements are added together, where the performance is similar to that in the circumstance in which the Zr element is added alone.

TABLE 8

| Serial number | Y element existent at a depth of up to 200 nm from outer surface of secondary particle | Type of Y element | Content of Y element | First-cycle discharge capacity (mAh/g) | 5 C/0.2 C capacity retention rate | $500^{th}$-cycle capacity retention rate |
| --- | --- | --- | --- | --- | --- | --- |
| Embodiment 29 | Yes | Zr | 0.001 | 217.8 | 88% | 79% |
| Embodiment 30 | Yes | Zr | 0.005 | 216.9 | 85% | 82% |
| Embodiment 31 | Yes | Zr | 0.01 | 216.1 | 83% | 85% |
| Embodiment 32 | Yes | Zr | 0.02 | 215.2 | 81% | 88% |
| Embodiment 33 | Yes | Zr + Mg | 0.002 | 217.0 | 84% | 80% |
| Embodiment 34 | Yes | Mg + Ti | 0.002 | 217.4 | 83% | 81% |
| Embodiment 35 | Yes | Zr + Mg + Ti | 0.002 | 217.2 | 83% | 80% |

TABLE 7

| Serial number | First-cycle discharge capacity (mAh/g) | 5 C/0.2 C capacity retention rate | $500^{th}$-cycle capacity retention rate |
| --- | --- | --- | --- |
| Embodiment 22 | 216.8 | 82% | 79% |
| Embodiment 23 | 217.5 | 84% | 78% |
| Embodiment 24 | 217.8 | 85% | 76% |
| Embodiment 25 | 218.5 | 86% | 75% |
| Embodiment 26 | 217.5 | 84% | 80% |
| Embodiment 27 | 218.3 | 86% | 78% |
| Embodiment 28 | 218.2 | 89% | 77% |

Embodiments 29 to 33 describe circumstances in which different Y elements are added.

Preparing a positive electrode active material: The preparation method includes: first, mixing $NiSO_4 \cdot 6H_2O$, $CoSO_4 \cdot 7H_2O$, and $WO_3$ at a molar ratio of Ni:Co:W=0.90:0.097:0.003 to make a suspension, using NaOH instead to make an alkaline solution, and using $NH_3 \cdot H_2O$ instead to make an ammonia solution; adding the three solutions, that is, saline solution, alkaline solution, and ammonia solution, into a reaction vessel concurrently; controlling a stirring speed to be 1,300 rpm during the reaction, and controlling the temperature to be 52±2° C. in a live manner by using a jacketed oil bath; adjusting a pH value to 11.2 by controlling a dosage of ammonia; after the reaction lasts for a first period T1, adding a mixed saline solution of $NiSO_4 \cdot 6H_2O$ and $CoSO_4 \cdot 7H_2O$ at a molar stoichiometric ratio of Ni:Co=0.90:0.1; at this stage, controlling the stirring speed to be 800 rpm, and adjusting the pH value to 11.7; and, after the reaction lasts for a second period T2, obtaining a slurry, and filtering, washing, and drying the slurry to obtain a precursor of a positive electrode material; and mixing the precursor and LiOH at a ratio of Li/(Ni+Co+W)=1.05, sintering the mixture at 780° C. for 18 hours to obtain a first sintered product, mixing the first sintered product and a Y An embodiment of this disclosure further discloses an electrochemical device, including: a positive electrode; a negative electrode; and a separator disposed between the positive electrode and the negative electrode. The positive electrode includes the positive electrode active material according to any embodiment of this disclosure.

A conductive agent or a binder may be added into the positive or negative electrode of the electrochemical device. The conductive agent may include one of or any combination of conductive carbon black, graphite sheet, graphene, and carbon nanotubes. The binder may include one of or any combination of polyvinylidene difluoride, a vinylidene fluoride-hexafluoropropylene copolymer, a styrene-acrylate copolymer, styrene-butadiene copolymer, polyamide, polyacrylonitrile, polyacrylic ester, polyacrylic acid, sodium polyacrylate, sodium carboxymethyl cellulose, polyvinyl acetate, polyvinylpyrrolidone, polyvinyl ether, poly methyl methacrylate, polytetrafluoroethylene, and polyhexafluoropropylene. In some embodiments, the separator includes one of or any combination of polyethylene, polypropylene, polyvinylidene fluoride, polyethylene terephthalate, polyimide, and aramid fiber. For example, the polyethylene includes one of or any combination of high-density polyethylene, low-density polyethylene, and ultra-high-molecular-weight polyethylene. Especially the polyethylene and the polypropylene are highly effective in preventing short circuits, and improve stability of the battery through a turn-off effect.

In some embodiments, a porous layer may be further disposed on a surface of the separator. The porous layer is disposed on at least one surface of the separator. The porous layer includes inorganic particles and a binder. The inorganic particles are selected from one of or any combination of aluminum oxide ($Al_2O_3$), silicon oxide ($SiO_2$), magnesium oxide (MgO), titanium oxide ($TiO_2$), hafnium dioxide ($HfO_2$), tin oxide ($SnO_2$), ceria ($CeO_2$), nickel oxide (NiO), zinc oxide (ZnO), calcium oxide (CaO), zirconium oxide ($ZrO_2$), yttrium oxide ($Y_2O_3$), silicon carbide (SiC), boehmite, aluminum hydroxide, magnesium hydroxide, calcium hydroxide, and barium sulfate. The binder is one of or any combination of polyvinylidene fluoride, vinylidene fluoride-hexafluoropropylene copolymer, polyamide, polyacrylonitrile, polyacrylate, polyacrylic acid, polyacrylate, sodium carboxymethyl cellulose, polyvinylpyrrolidone, polyvinyl ether, poly methyl methacrylate, polytetrafluoroethylene, and polyhexafluoropropylene. The porous layer on the surface of the separator can improve heat resistance, oxidation resistance, and electrolyte infiltration performance of the separator, and enhance adhesion between the separator and the electrode plate.

In some embodiments, the electrochemical device further includes an electrolytic solution. The electrolytic solution includes at least two of dimethyl carbonate (DMC), ethyl methyl carbonate (EMC), diethyl carbonate (DEC), ethylene carbonate (EC), propylene carbonate (PC), and propyl propionate (PP). Further, the electrolytic solution may additionally include at least one of the following as an electrolyte additive: vinylene carbonate (VC), fluoroethylene carbonate (FEC), and a dinitrile compound.

In some embodiments of this disclosure, the positive electrode active material further includes a carbon material. The carbon material may be at least one of graphene, carbon nanotube, carbon fiber, or carbon black. A length-to-diameter ratio of the carbon nanotube may be 500 to 100,000. A weight ratio of the carbon nanotube to the positive electrode active material is 0.2% to 2%.

In some embodiments of this disclosure, a graphitization degree of the negative electrode is within a range of 94% to 96%, and a Raman spectroscopy Id/Ig ratio of the negative electrode is within a range of 0.02 to 0.6. In some embodiments of this disclosure, the electrolytic solution contains a fluorinated chain ester whose fluorine content is within a range of 40% to 80%, and a weight ratio of the fluorinated chain ester to the electrolytic solution is less than or equal to 30%.

An embodiment of this disclosure further discloses an electronic device that includes the electrochemical device disclosed herein. For example, the electronic device includes a mobile phone containing a lithium-ion battery.

Figure 2:
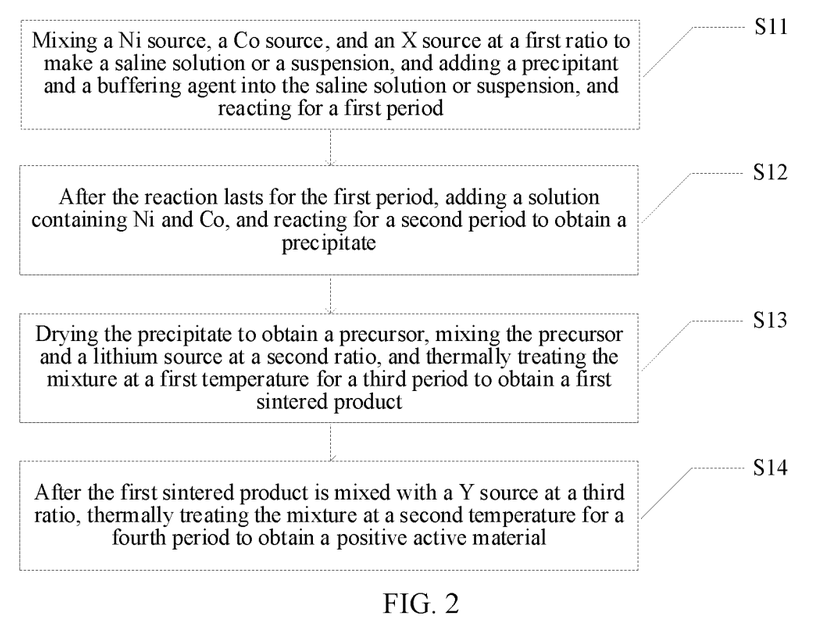
FIG. 2 is a flowchart of a method for preparing a positive electrode active material according to an embodiment of this disclosure.

An embodiment of this disclosure further discloses a method for preparing a positive electrode active material. Referring to FIG. 2, the preparation method includes the following steps.

S11: Mixing a Ni source, a Co source, and an X source at a first ratio to make a saline solution or a suspension, and adding a precipitant and a buffering agent into the saline solution or suspension, and reacting for a first period.

Specifically, the precipitant may be alkali lye such as NaOH. Optionally, a molar percent of the Ni source, the Co source, and the X source is (0.7-0.99):(0.05-0.2):(0.01-0.05), respectively. Optionally, the first period is 10 minutes to 2 hours.

S12: After the reaction lasts for the first period, adding a solution containing Ni and Co, and reacting for a second period to obtain a precipitate;

Optionally, the second period is 15 hours to 30 hours.

S13: Drying the precipitate to obtain a precursor, mixing the precursor and a lithium source at a second ratio, and thermally treating the mixture at a first temperature for a third period to obtain a first sintered product;

Optionally, the first temperature is 750° C. to 850° C., and the third period is 14 hours to 24 hours. Optionally, the molar ratio of the lithium source and the precursor is the second ratio, and the second ratio is 1.01 to 1.15.

S14: After the first sintered product is mixed with a Y source at a third ratio, thermally treating the mixture at a second temperature for a fourth period to obtain a positive electrode active material.

Specifically, the molar ratio of the first sintered product and the Y source is the third ratio, and the third ratio is (1−n):n, where $0.001 \leq n \leq 0.02$. Optionally, the second temperature is 500° C. to 650° C., and the fourth period is 10 hours to 16 hours. In some embodiments, in order to add the Y element in a near-surface scope of the positive electrode active material, the second temperature is lower than a temperature at which the positive electrode active material crystallizes.

In the foregoing preparation method embodiment, both the content of the X element and the first period affect the size, length-to-width ratio, and porosity of the primary particles in the inner part. With a smaller content of the X element, the first period is shorter, the size of the primary particles in the inner part is smaller, the length-to-width ratio is smaller, and the porosity is larger. However, the lattice spacing corresponding to the crystal plane of the primary particle (003) in the inner part merely depends on the content of the X element. The second period mainly affects the size and the length-to-width ratio of the primary particles in the outer part. The longer the second period, the larger the size of the primary particles in the outer part, and the larger the length-to-width ratio. In addition, in this solution, the pH value and the rotation speed also affect the length-to-width ratio of the primary particles considerably. The larger the pH value, the lower the rotation speed, and the larger the length-to-width ratio of the primary particles. Therefore, in some embodiments of this disclosure, in order to control the length-to-width ratio of the primary particles, the pH value is controlled to be 11.0~11.5 during the first period of reaction of the precipitant and the buffering agent that are added into the saline solution or the suspension, and the mixture is stirred at a rotation speed of 1,200 rpm to 1,500 rpm. In some embodiments, the pH value is controlled to be 11.5 to 12.5 during the second period of reaction of the added mixed saline solution containing Ni and Co, and the mixture is stirred at a rotation speed of 800 rpm to 1,000 rpm.

In some embodiments of this disclosure, the preparation method further includes: coating the surface of the active material with an oxide containing at least one of Al, Zr, Mg, and B.

The foregoing descriptions are merely intended to describe preferred embodiments of this disclosure and the technical principles thereof. A person skilled in the art understands that the disclosure scope hereof is not limited to the technical solutions formed from specific combinations of the foregoing technical features, but covers other technical solutions formed by combining the foregoing technical features or equivalents thereof in any manner without departing from the conceptions disclosed herein. For example, the disclosure scope hereof also covers the technical solutions formed by replacing any of the foregoing features with the technical features serving similar functions disclosed herein.

In addition, although the operations are described in specific order, the operations are not necessarily performed in the order shown herein or in any particular order. In some circumstances, multitasking and parallel processing may be advantageous. Similarly, although implementation details are included in the foregoing description, the implementation details are in no way to be construed as a limitation on the scope of this disclosure. Some features that are described in the context of a separate embodiment may be implemented in combination in an individual embodiment. Conversely, various features described in the context of an individual embodiment may also be implemented in a plurality of embodiments separately or in combination as appropriate.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A positive electrode active material, comprising:
   a secondary particle formed from a plurality of primary particles, wherein
   the secondary particle comprises an inner part and an outer part that wraps the inner part;
   a ratio of an average particle size of primary particles in the outer part to an average particle size of primary particles in the inner part is G, and 2.44≤G≤10, wherein the average particle size of primary particles in the outer part is within the range of 2.99 μm to 5.02 μm;
   the outer part is a region from an interface of the secondary particle to a surface of the secondary particle, and the inner part is a region from the interface of the secondary particle to a center of the secondary particle;
   a line segment connecting a midpoint of a longest diameter of the secondary particle to any point on the surface of the secondary particle defines a radius of the secondary particle; and the interface of the secondary particle is a plane passing through a midpoint of the radius of the secondary particle;
   a ratio of an average length-to-width ratio of the primary particles in the outer part to an average length-to-width ratio of the primary particles in the inner part is H, and 1.1≤H≤2.7; and
   a ratio of a porosity of the inner part to a porosity of the outer part is J, and 2≤J≤20.

2. The positive electrode active material according to claim 1, wherein a content of an X element in the inner part is higher than a content of the X element in the outer part, and the X element comprises at least one of W, Nb, V, or Mo.

3. The positive electrode active material according to claim 2, wherein the secondary particle satisfies at least one of conditions (a) to (c):
   (a) a molar ratio of the X element contained in the outer part to the X element contained in the inner part is greater than or equal to 0 and less than or equal to 0.2;
   (b) a molar percent of the X element in the inner part in relation to aggregate transition metal elements in the inner part is within a range of 0.1% to 5%; and
   (c) a molar percent of the X element in the outer part in relation to aggregate transition metal elements in the outer part is within a range of 0% to 0.5%.

4. The positive electrode active material according to claim 1, wherein the secondary element comprises a Y element at a depth of up to 200 nm from the surface of the secondary particle, and the Y element comprises at least one of Mg, Ti, or Zr.

5. The positive electrode active material according to claim 1, wherein
   an average length-to-width ratio of the primary particles in the inner part is within a range of 1 to 3; and/or
   an average length-to-width ratio of the primary particles in the outer part is within a range of 1.5 to 8.

6. The positive electrode active material according to claim 1, wherein
   a porosity of the inner part is within a range of 5% to 20%; and/or
   a porosity of the outer part is within a range of 1% to 6%.

7. The positive electrode active material according to claim 1, wherein a quantity of the primary particles on any diameter of the secondary particle is greater than 5.

8. The positive electrode active material according to claim 1, wherein the secondary particle comprises a compound represented by a chemical formula $Li_cNi_{1-a-b-m-n}Co_aMe_bX_mY_nO_{2-d}Z_d$, wherein 0.90≤c≤1.10, 0.05≤a≤0.2, 0≤b≤0.1, 0.001≤m≤0.05, 0.001≤n≤0.02, 0≤d≤0.05, and 0.7<1−a−b−m−n<0.99; and
   Me is at least one of elements Mn and Al, X is at least one of elements W, Nb, V, and Mo, Y is at least one of elements Mg, Ti, and Zr, and Z is at least one of elements S, P, and Cl.

9. An electrochemical device, comprising:
   a positive electrode;
   a negative electrode; and
   a separator, disposed between the positive electrode and the negative electrode,
   wherein the positive electrode comprises the positive electrode active material, wherein the positive electrode active material comprises:
   a secondary particle formed from a plurality of primary particles, wherein
   the secondary particle comprises an inner part and an outer part that wraps the inner part;
   a ratio of an average particle size of primary particles in the outer part to an average particle size of primary particles in the inner part is G, and 2.44≤G≤10, wherein the average particle size of primary particles in the outer part is within the range of 2.99 μm to 5.02 μm;
   the outer part is a region from an interface of the secondary particle to a surface of the secondary particle, and the inner part is a region from the interface of the secondary particle to a center of the secondary particle;
   a line segment connecting a midpoint of a longest diameter of the secondary particle to any point on the surface of the secondary particle defines a radius of the secondary particle; and the interface of the secondary particle is a plane passing through a midpoint of the radius of the secondary particle;
   a ratio of an average length-to-width ratio of the primary particles in the outer part to an average length-to-width ratio of the primary particles in the inner part is H, and 1.1≤H≤2.7; and
   a ratio of a porosity of the inner part to a porosity of the outer part is J, and 2≤J≤20.

10. The electrochemical device according to claim 9, wherein a content of an X element in the inner part is higher than a content of the X element in the outer part, and the X element comprises at least one of W, Nb, V, or Mo.

11. The electrochemical device according to claim 10, wherein the secondary particle satisfies at least one of conditions (a) to (c):
    (a) a molar ratio of the X element contained in the outer part to the X element contained in the inner part is greater than or equal to 0 and less than or equal to 0.2;
    (b) a molar percent of the X element in the inner part in relation to aggregate transition metal elements in the inner part is within a range of 0.1% to 5%; and
    (c) a molar percent of the X element in the outer part in relation to aggregate transition metal elements in the outer part is within a range of 0% to 0.5%.

12. The electrochemical device according to claim 9, wherein the secondary element comprises a Y element at a depth of up to 200 nm from the surface of the secondary particle, and the Y element comprises at least one of Mg, Ti, or Zr.

13. The electrochemical device according to claim 9, wherein
   an average length-to-width ratio of the primary particles in the inner part is within a range of 1 to 3; and/or
   an average length-to-width ratio of the primary particles in the outer part is within a range of 1.5 to 8.

14. An electronic device, wherein the electronic device comprises the electrochemical device according to claim 9.

15. The positive electrode active material according to claim 1, wherein the average particle size of primary particles in the inner part is within the range of 1.05 μm to 2 μm.

16. The electrochemical device according to claim 9, wherein the average particle size of primary particles in the inner part is within the range of 1.05 μm to 2 μm.

* * * * *